Figure 1:
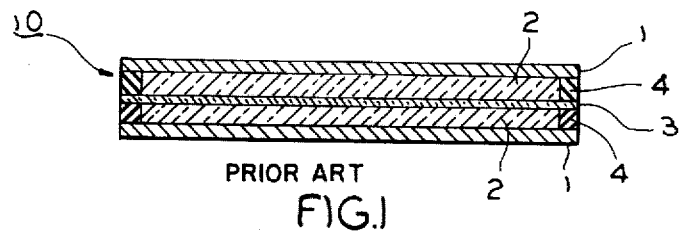

United States Patent [19]

Hosokawa et al.

[11] 4,313,084
[45] Jan. 26, 1982

[54] LAMINATED STRUCTURE OF DOUBLE-LAYER CAPACITOR

[75] Inventors: Masashi Hosokawa; Kei Sanada; Takuro Kawamura, all of Tokyo, Japan

[73] Assignee: Nippon Electric Co., Ltd., Tokyo, Japan

[21] Appl. No.: 22,982

[22] Filed: Mar. 22, 1979

[30] Foreign Application Priority Data

Mar. 27, 1978 [JP] Japan .................................. 53-35800
Mar. 27, 1978 [JP] Japan .................................. 53-35801

[51] Int. Cl.³ .......................... H01C 3/10; H01G 4/40
[52] U.S. Cl. .................................... 323/370; 338/211; 338/212; 338/292; 338/308; 338/334; 361/433
[58] Field of Search ................... 323/74, 93, 370; 338/211, 212, 258, 263, 267, 301, 292, 308, 334; 361/272, 328, 329, 433; 363/59

[56] References Cited

U.S. PATENT DOCUMENTS

| | | | |
|---|---|---|---|
| 3,121,835 | 2/1964 | Diebold | 363/59 |
| 3,536,963 | 10/1970 | Boos | 361/433 |
| 4,159,459 | 6/1979 | Sease et al. | 338/292 X |
| 4,161,774 | 7/1979 | Behn | 363/59 |

Primary Examiner—A. D. Pellinen
Attorney, Agent, or Firm—Laff, Whitesel, Conte & Saret

[57] ABSTRACT

A laminated structure comprises a plurality of double-layer capacitor unit cells, each having a high withstand voltage. A complete capacitor is made by laminating a plurality of unit cells of the double-layer capacitors type and by connecting a plurality of resistors, having substantially equal resistances, in parallel with the respective unit cells. In a preferred embodiment, a high-precision integrated voltage-equalizing resistor is prepared by laying linear resistors on a flexible sheet which is then wrapped around the laminated unit cells.

4 Claims, 8 Drawing Figures

LAMINATED STRUCTURE OF DOUBLE-LAYER CAPACITOR

The present invention relates to double-layer capacitors, and more particularly to improvements in a multi-cell laminated structure of double-layer capacitors formed by laminating a plurality of unit cells, especially for use when it is necessary to withstand high voltages.

In general, a withstand voltage for a unit cell of a double layer capacitor is determined by the smaller of the decomposition voltages of an electrolyte and a solvent, which form the component elements of the unit cell. For instance, in the case of aqueous solution systems employing sulfic acid or caustic alkali as such an electrolyte, the withstand voltage of the unit cell is about 1.0 volt.

In the case of organic solvents having high dielectric constants such as propylene carbonate, N,N-dimethylformaldehyde, acetonitrile or γ-butyrolactone, the withstand voltage is about 3 to 5 volts. Although, it also depends upon a decomposition voltage of the salt ions which are used. If a voltage which is higher than the decomposition voltage of solvent is applied to a unit cell, then the function of the cell is destroyed.

Accordingly, if a high withstand voltage exceeding this decomposition voltage is required for double-layer capacitor, it is a common practice to laminate a necessary number of unit cells to be completed in series. A voltage applied to each unit cell can be thereby suppressed to lower than the breakdown voltage, i.e., the withstand voltage of the unit cell.

In the above-described case, if a direct current (D.C.) voltage is applied to such a laminated double-layer capacitor assembly, the applied voltage is shared by the respective unit cells in proportion to the insulation resistances of the respective unit cells. Then, as the fluctuation amplitude of the insulation resistance of the respective unit cells becomes larger, the fluctuation in the voltages applied to the respective unit cells also becomes larger.

Fluctuations in the voltages applied to the respective unit cells are due to the fluctuations in the insulation resistances. If a voltage corresponding to a withstand voltage per unit cell, multiplied by the number of the laminated unit cells, for example, is applied to the laminated double-layer capacitor, any one of the laminated cells could experience a voltage exceeding the withstand voltage of the unit cell. Consequently, that unit cell would be damaged, resulting in a loss of the function of the overall capacitor.

To prevent such a break-down, it is conceivable to form a laminated double-layer capacitor having a predetermined withstand voltage. By selecting unit cells having substantially equal insulation resistances or by laminating a sufficiently large number of unit cells with a sufficient margin, even the unit cell sharing the largest voltage in the laminated double-layer capacitor may not be damaged. However, upon industrialization of laminated double-layer capacitors, such a solution would be associated with many difficulties. That is, improvements and developments of manufacturing techniques such as controlling the fluctuation in the insulation resistances of the unit cells to within about 10% or the like, are extremely difficult. In addition, more labor and more raw material would be required if an attempt is made to compensate for the fluctuation in the insulation resistances by selecting only the unit cells having substantially equal insulation resistances or by increasing the number of the laminated unit cells. A resulting disadvantage is that cost of products is raised. Furthermore, if unit cells are laminated to construct a laminated double-layer capacitor, a deviation in position would occur between component unit cells. Contact resistances between the respective adjacent unit cells would be increased and thus impedance characteristics of the laminated double-layer capacitor were unstable. Accordingly, a double-layer capacitor formed by merely laminating a plurality of unit cells has not only poor stability and reliability of characteristics but also a high cost, as compared to the conventional aluminum electrolytic capacitor or the like. Thus, its marketability was poor and its industrialization could not be achieved.

It is one object of the present invention to provide a laminated type, double-layer capacitor having a high withstand voltage which can be easily manufactured.

Another object of the present invention is to provide a laminated multi-cell double-layer capacitor structure suitable for mass production which can achieve a great saving in raw material cost and working cost.

Still another object of the present invention is to provide a laminated multi-cell double-layer capacitor structure which has high reliability and high stability in operations, for application to electronic equipment.

Yet another object of the present invention is to provide a laminated double-layer capacitor which is made more compact by employing a more practical structure of resistors for equalizing the voltages applied across the respective cells in the laminated double-layer capacitor, and which is highly reliable and suitable for mass production.

According to one feature of the present invention, a laminated double-layer capacitor uses resistors having substantially equal resistances, which are connected respectively in parallel to the respective unit cells in the laminated double-layer capacitor. The resistors are favorably coupled to the laminated unit cells in such a manner that one terminal of the respective resistor is inserted between one and its upper unit cells. The other terminal is inserted between the same one cell and its lower unit cells.

According to one particular feature of the present invention, a laminated double-layer capacitor has a high-precision integrated resistor subassembly formed by laying linear resistors repeated in the same pattern on a flexible sheet. These resistors are used for equalizing the voltages across the respective cells. The sheet is wrapped around the laminated capacitor assembly before the assembly is accommodated in an outer casing.

Figure 2:
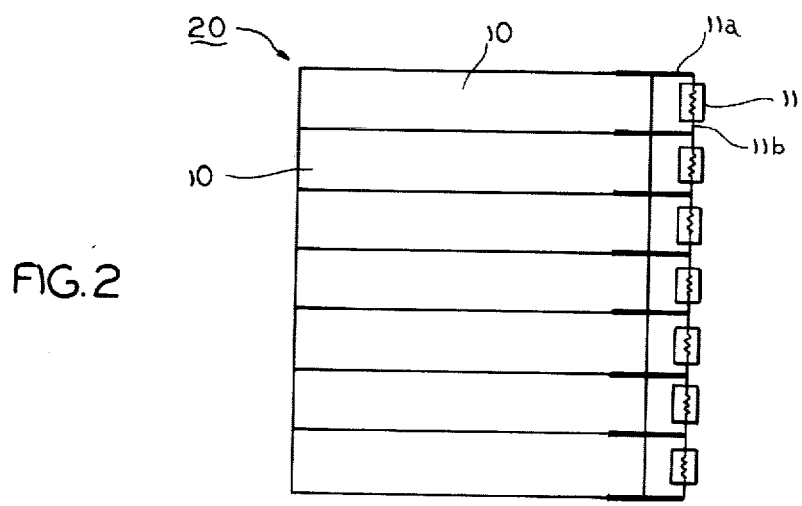
Figure 3:
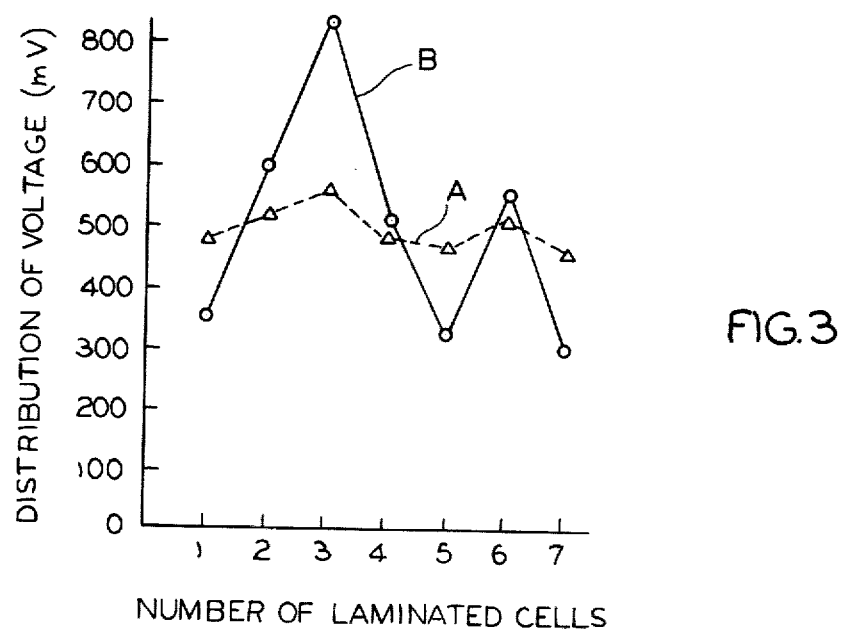
Figure 4A:
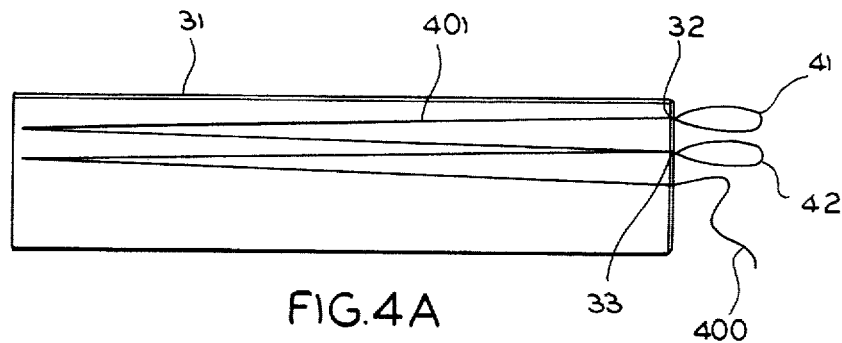
Figure 4B:
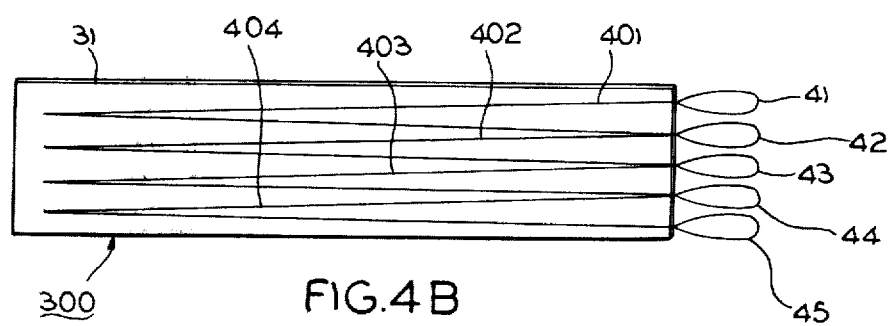
Figure 5:
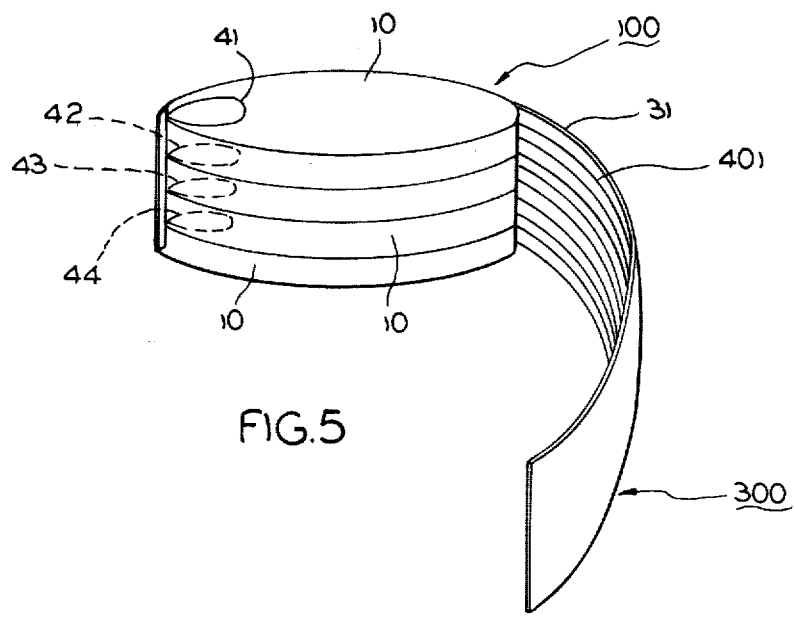
Figure 6A:
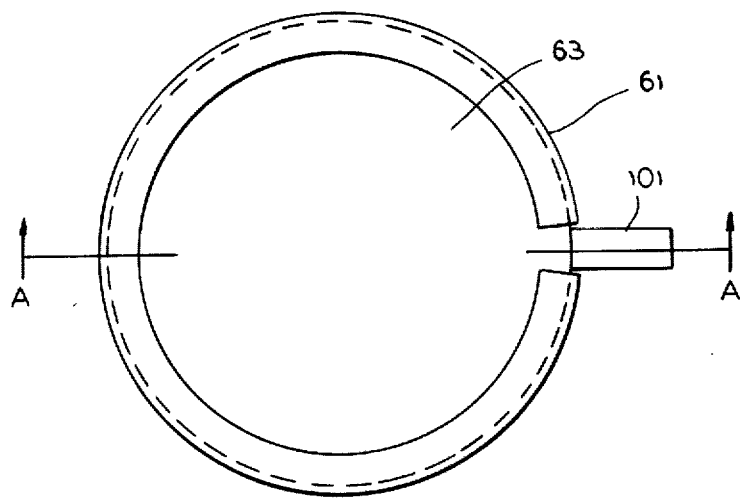
Figure 6B:
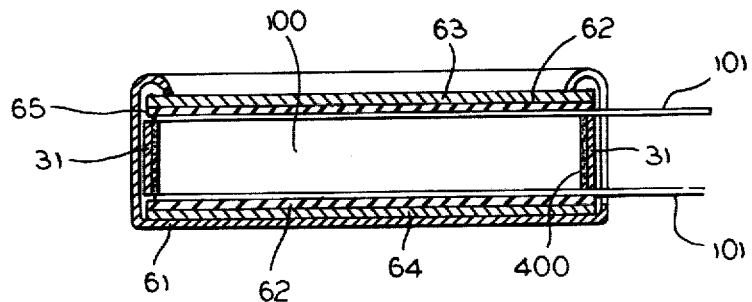

The above-mentioned and other features and objects of the present invention will become more apparent by reference to the following description of its preferred embodiment taken in conjunction with the accompanying drawings, wherein:

FIG. 1 is a cross-section view of a unit cell of a conventional double-layer capacitor, FIG. 2 is a schematic view showing a principle of a laminated multi-cell double-layer capacitor assembly according to the present invention, FIG. 3 is a characteristic diagram showing the distribution of voltage across the respective unit cells in the laminated double-layer capacitors, solid line B representing the voltage distribution in a capacitor in which unit cells are simply laminated without equal resistances being associated therewith, and dotted line A representing the voltage distribution in a capacitor according to the present invention in which equal resistances are associated with the respective unit cells, FIG. 4A is a plan view showing an intermediate step in the manufacture of one preferred embodiment of a resistor subassembly used for equalizing the voltages across the respective unit cells, FIG. 4B is a plan view showing one preferred embodiment of the voltage-equalizing resistors as applied to a 4-cell laminated double-layer capacitor, FIG. 5 is a perspective view showing the mode of connecting the resistor in FIG. 4B in parallel to a 4-cell laminated double-layer capacitor as being wrapped around the latter, FIG. 6A is a plan view of the voltage-equalized multi-cell laminated double-layer capacitor shown in FIG. 5, as accommodated within an outer casing, and FIG. 6B is a cross-section view taken along line A—A in FIG. 6A as viewed in the direction of the arrows.

In FIG. 1 of the drawings, a unit cell 10 of a double-layer capacitor comprises paste electrodes 2 comprising activated carbon particles and an electrolyte solution sandwiched between a pair of disc-shaped conductive separators 1, which are electronically conductive and impermeable for ions. Between these paste electrodes 2 is disposed a disc-shaped porous separator 3, which is permeable for ions and prevents electronic conduction. Separator 3 prevents conduction between the paste electrodes 2. In order to hold the conductive separators 1 and to shield the paste electrodes 2 from the environmental atmosphere, a ring-shaped non-conductive gasket 4 is provided. The interconnection of the parts by gasket 4 completes a unit cell 10 having a double-layer, capacitor construction. For further details of the unit cell 10, reference should be made to U.S. Pat. No. 3,536,963 issued to Donald L. Boos.

With reference to FIG. 2, an assembly 20 comprises seven such unit cells 10, laminated in series. Terminal leads 11a and 11b of resistors 11 are clamped between upper and lower conductive separators 1 of the adjacent unit cells 10, as they are brought into contact with each other. It is necessary to select the resistances of the respective resistors 11, connected in parallel with the respective unit cells 10, so that all resistances are substantially equal (within ±5%) to each other.

This assembly 20 is accommodated within an outer casing as will be described later. The upper and lower surfaces of the assembly are connected externally so that the connections may be led out of the casing as voltage applying electrodes. Pressure is applied between the bottom and the top lid of the casing to fix the entire assembly. Owing to this pressurizing operation, contact resistances between the respective unit cells, between the unit cell and the electrode lead, and within the respective unit cells can be reduced. This pressure also prevents withdrawal of the terminal leads of the resistor 11, and thereby provides a stable structure. In order to fix and stably hold the resistors 11, it is preferable to fixedly secure the resistors 11 onto the inner wall surface of the outer casing.

Now the invention will be described in greater detail with respect to one preferred embodiment, with further reference to FIGS. 1 and 2. The conductive separator 1 is a butyl rubber sheet mixed with conductive carbon, the sheet being about 28 mm in diameter and about 0.3 mm in thickness. For the paste electrode 2, a mixture is prepared by mixing fine activated carbon powder having a surface area of 1100 m$^2$/g (under B.E.T. method) and grain diameters of 325 mesh or smaller with sulfuric acid of 21% by weight. The mixture is fully stirred. For the porous separator 3, a propylene porous film is used. For the non-conductive gasket 4, a butyl rubber gasket is used, in the dimensions of 28 mm in outer diameter, 22 mm in inner diameter and 0.38 mm in thickness, and having a specific resistance of $10^{11}$ Ω.cm. With a unit cell 10 having the conductive separators 1 assembled with the gasket 4, and after a total pressure of about 30 Kg has been applied between the respective conductive separators 1, a D.C. electrostatic capacitance of 2–3 F and an insulation resistance of 1–3 KΩ have been obtained.

Seven such unit cells 10 were selected and a 7-cell laminated double-layer capacitor 20 was manufactured by laminating these unit cells 10 with resistors 11, each having a resistance of about 100Ω (±10%) which corresponds to 1/10 times the minimum insulation resistance of 1 KΩ connected in parallel with the respective unit cells. With an applied voltage of 6 V, the electrostatic capacity of the laminated capacitor 20 took a value of about 0.4 F, and its leakage current was about 8 mA.

As compared to a rated leakage current of 0.03 CVμA for the conventional aluminum electrolytic capacitors in the prior art, this leakage current is lower than the rated value. In addition, it is to be noted that, by adding the voltage-equalizing resistors in parallel with the unit cells, the leakage current is not increased excessively. Therefore, the capacitor does not lose its practical and industrial value.

In connection with this 7-cell laminated double-layer capacitor 20, a description will now be made on how the voltage is distributed over the respective unit cells. The above-described 7-cell laminated double-layer capacitor 20 has the respective resistors 11 connected in parallel with the respective capacitors. When a voltage of about 3.5 V is applied across the entire assembly, the voltage distribution over the respective unit cells is measured. It is found that the respective voltage could be equalized within a fluctuation of 100 mV in the voltage difference which is shown by a dotted line in FIG. 3. It is also established that the withstand voltage is higher than 6.0 V.

The resistors 11 are extracted from the 7-cell laminated double-layer capacitor 20, having the aforementioned resistors connected in parallel with the respective unit cells, a total pressure of a few tens of Kg is applied to the assembly, and the voltages distributed over the respective unit cells are likewise measured. Then, a fluctuation exceeding 500 mV in voltage difference occurs, as shown by solid line B in FIG. 3. The withstand voltage is only 4.1 V, at the highest. Accordingly, it is necessary to adjust the number of the laminated unit cells in proportion to the magnitude of the desired withstand voltage. It is found that, in order to obtain a withstand voltage of 6 V which is equal to the withstand voltage when the resistors 11 are connected in parallel to the unit cells, it is necessary to laminate ten or more unit cells 10.

For the purpose of equalizing the voltages across the respective laminated unit cells, as described above, it is only necessary to prepare resistor elements 11 having substantially equal resistances, with as many resistances as there are laminated cells. The resistor elements are electrically connected in parallel with the respective cells 10. If these resistor elements 11 are integrated, the workability will be enhanced. Therefore, a description will be made of one preferred embodiment of the present invention, in which a group of integrated resistors are used for equalizing the voltages across the unit cells in a laminated double-layer capacitor.

As shown in FIG. 4A, a resistance wire 400, having a uniform resistance per unit length, is laid on a flexible sheet 31 such as a tacky plastic film. The same pattern is repeated through use of a well-known method, such as weaving, arraying or the like. A loop 41 is formed outside of the start point 32 of the wiring, connecting the resistance wire 400 to a unit cell 10. The resistance wire 400 is laid on the sheet 31, so as to extend from one point 32 on the right edge of the sheet 31 towards its left edge. When the resistance wire 400 has been extended up to the proximity of the left edge of the sheet 31, it is folded to again extend towards the right edge. When it has been extended back to another point 33 on the right edge, that point is chosen as an end point of the wiring for a first resistor element 401.

The resistance wire 400 projects to the outside of the sheet 31 from the wiring terminal point 33, without being interrupted, and forms a second loop 42 which serves as a terminal of the first and a successive resistors. Through such a wiring process, the first resistor element 401 and its connecting terminals 41 and 42 have been completed. The distance between the start point 32 and the end point 33 of the wiring on the right edge of the sheet 31, that is, the interval between the adjacent loops 41 and 42, is substantially equal to the thickness of the unit cells 10 which are to be laminated. The first and second loops 41 and 42 make contact with the upper and lower surfaces of the unit cell. The resistor element 401 has a resistance proportional to the distance which the wiring extends back and forth on the sheet 31, which wiring is connected in parallel with the unit cell.

Apparently the resistance of each resistor element can be adjusted by varying the diameter of the resistance wire and the wiring distance. If the wiring is repeated in substantially the same pattern, then a group of resistor elements having substantially equal resistances and a group of connecting terminals can be realized in an integrated form on one sheet. Therefore, a desired voltage-equalizing resistor assembly can be provided by repeating the wiring process according to the number of the unit cells which are to be laminated. Instead of a resistive wire on the sheet 31, a resistive layer deposited on the sheet 31 may be used.

With reference to FIG. 4B, a voltage-equalizing resistor assembly 300 is adapted for a laminated double-layer capacitor consisting of four unit cells. The resistance wire has four back and forth extensions in the same pattern on the sheet 31. From the starting point and end point of the respective wiring patterns 401, 402, 403 and 404 extend five loops 41, 42, 43, 44, and 45 made of the same resistance wire 400. These loops project outside of the sheet 31. Among these projecting loops, the inner three loops 42, 43 and 44 are inserted between the respective unit cells 10 when the four unit cells 10 are assembled. The remaining top and bottom loops 41 and 45 are connected to the upper and lower ends of the laminated unit cell assembly 100, as shown in FIG. 5.

The sheet 31 is wrapped around the laminated unit cell assembly with its wired surface directed inwardly. As shown in FIG. 6A and FIG. 6B, leads 101 form the output electrodes and are connected to the top and bottom of the laminated unit cell assembly 100. Then the whole assembly is accommodated within a metallic housing can 61, and is thus canned while a predetermined pressure is held applied to the top and bottom of laminated unit cell assembly 100. Within the can 61, a top plate 63 is made of the same material as the housing can 61. A metallic top plate 63 and bottom plate 64 are disposed above and under the laminated unit cell assembly, and separated thereby by rubber insulation plates 62. After the can has been fastened together, the interior of the housing can 61 is potted with a potting resin 65. The rubber insulation plates 62 remove the risk of short-circuiting through the metallic housing can 61, and also function as resilient bodies for making a uniform pressure applied to the double-layer capacitor 100 and for holding the capacitor 100. The metallic bottom plate 64 is used for reinforcement of the metallic housing can 61, and so, if the strength of the metallic housing can is sufficiently high, then it is not always necessary to provide plate 64.

Enumerating various data for one practical example of the voltage-equalizing resistor assembly illustrated in FIG. 4A and FIG. 4B, for the resistance wire 400 is employed a nichrome (Ni-Cr) wire (Ni: 75-85%, Cr: 25-15%) having a diameter of 60 $\mu m\phi$ and a specific resistance of 133 $\mu\Omega$-cm and having its surface coated by polurethane insulation. The flexible sheet 31 has a tackiness on one surface can be easily obtained by applying a two-sided tacky tape, without leaving any gap space, over one entire surface of a polypropylene film of 6 mm in width, 100 mm in length and 0.3 mm in thickness. In one example of the wiring pattern, the diameter of the respective loops 41–45 is 10 mm, and the distance between the adjacent loops is the 1.5 mm that is equal to the thickness of the unit cell, whereby stability in holding the laminated unit cell assembly can be enhanced. By making the wiring distance 210 mm in the respective resistor element sections 401, 402, 403 and 404, through the back and forth extensions, resistor elements, each having a resistance and a precision of $100\pm2\Omega$, can be obtained. As a matter of course, the insulation coating is removed from the sections of the terminal loops 41–45. For the purpose of eliminating the labor required for removing the insulation coating, a method can be employed in which after a bare wire has been laid an insulation coating film is applied onto the wired surface of the sheet. In addition, for the purpose of facilitating an insertion into the gap spaces between the unit cells, the respective loops are twisted so that the planes defined by the respective loops may be placed perpendicular to the surface of the sheet.

One practical example of the housing can 61 is made of a zinc-plated steel sheet, having dimensions of 32 mm$\phi$ in inner diameter $\times$ 0.5 mm in thickness and being provided with notches of 6.5 mm in width $\times$ 17 mm in length for inserting the leads 101 used for leading out electrodes. The inner surface of can 61 has a resin lining treatment. Four unit cells prepared through the above-mentioned process are laminated in series. The laminated assembly is accommodated within the housing can together with a metallic bottom plate 64, insulation rubber plates 62, leads 101 forming the lead out electrodes and a top plate 63 so as to take the same construction as shown in FIG. 6A and FIG. 6B. Then they are sealingly caulked by means of a caulking metallic die so that a pressure of 30 Kg/cm$^2$ may be applied to the laminated double-layer capacitor 100. Thereafter the interior of the housing can is potted with a room temperature curing type double-fluid epoxy potting resin. A laminated, double-layer capacitor having a sealingly caulked housing structure is thus obtained.

The withstand voltage of the above-described 4-cell laminated double-layer capacitor 100 was measured. The capacitor employing the voltage-equalizing resistor assembly 300 shown in FIG. 4B had a withstand voltage of 3.9 V. A similar capacitor, not employing any resistor for making the voltage distribution uniform, had a withstand voltage of 3.3 V. It is to be noted that the term "withstand voltage," as used throughout this specification, is intended to mean the voltage which is applied to a laminated double-layer capacitor when a unit cell sharing the maximum voltage among the laminated unit cells experiences the withstand voltage 1.0 V of the unit cell during the process of gradually increasing a D.C. voltage applied to the laminated double-layer capacitor, starting from zero volt.

As will be apparent from the above-described preferred embodiment of the present invention, it has been verified that by employing voltage-equalizing resistors in a laminated double-layer capacitor, the magnitude of the fluctuation in the voltages applied across the respective unit cells can be reduced by a factor of 1/10, the reduction being from 200 mV to 20 mV. The withstand voltage can be also enhanced by about 18%.

Now the effects and advantages of the present invention are summarized and enumerated as follows:

(i) By additionally connecting resistors 11 having a resistance value of 1/5 to 1/10 of the minimum insulation resistance among the insulation resistances having fluctuations of the unit cells, the fluctuations in voltages across the respective unit cells can be suppressed to within 10~20% and that is a practically acceptable range.

(ii) Accordingly, the labor required for selecting and classifying the insulation resistances of the respective unit cells, selecting and matching resistors suitable for the respective insulation resistances, etc., can be saved. If the value of the equal resistances is determined, it is easy to manufacture a laminated type double-layer capacitors having a high withstand voltage.

(iii) By merely connecting additional and equal resistors, the number of unit cells to be laminated can be greatly reduced, resulting in a large savings of raw material cost and working cost, so that the manufacture is easy and the process is adapted for mass production.

(iv) Since the equalization of the shared voltages can be achieved even with a high operating voltage, reliability and stability of operations in electronic instruments can be expected.

In addition to the above-described effects and advantages, if the integrated voltage-equalizing resistor assembly illustrated in FIG. 4B is employed, the following additional effects and advantages can be provided:

(v) Since the respective voltage-equalizing resistors are integrated, the step of laminating unit cells, that is, the assembly of a capacitor is facilitated and so, the capacitors according to the present invention are suitable for mass production.

(vi) Since the periphery of the unit cells is wrapped by the voltage-equalizing resistor assembly, deviation in the positions of the unit cells can be prevented. Short-circuiting between unit cells and between a unit cell and a casing can be also prevented. The impedance characteristics of the capacitor can be stabilized.

While a support having flexibility was employed to meet the structure and configuration of the unit cells in the above-described embodiment, it is a matter of course that a further improved effect would be attained if a material having such a greater strength such as metal, ceramics or resin, is used for the support in order to enhance the mechanical strength after lamination.

(vii) In the above-described embodiment of the invention, resistors are prepared in an integrated form, by means of a thin resistance wire. The magnitude of the resistances may be adjusted by varying the diameter and length of the resistance wire. Since the resistor assembly is wrapped around a laminated double-layer capacitor, the capacitor can be made more compact and thinner as compared to the conventional resistor elements presently available in the market. Also mechanically stable capacitors can be obtained. It is to be noted that, for the support of the resistors, preferably an insulating material should be used for preventing short-circuiting between the support and the resistors. As a matter of course, if the voltage-equalizing resistor assembly is produced by forming a resistor on the support through sputtering, evaporation, printing or the like, then the capacitor could be made even more compact and thinner.

What is claimed is:

1. A laminated double-layer capacitor comprising a main capacitor body formed by laminating a plurality of double-layer capacitors unit cells so as to connect said cells in series, a group of resistors laid on a flexible sheet, each of said resistors having substantially equal resistances, and a plurality of resistor terminals connected to said respective resistors and also connected to said unit cells so that the respective resistors are electrically connected in parallel with the respective unit cells, said flexible sheet being wrapped around said main capacitor body.

2. A double-layer capacitor as claimed in claim 1, in which said resistors are formed by a configuration of resistance wire laid on said flexible sheet.

3. A double-layer capacitor as claimed in claim 1, in which said resistor terminals project from one edge of said sheet.

4. A double-layer capacitor as claimed in claim 1, in which said resistance wire and terminals for the respective resistors form a continuous body made of a common material, the interval between the terminals being substantially equal to the thickness of said unit cell, each said terminals forming a loop, and the assembly of said unit cells and said sheet being housed within a casing.

* * * * *